US011866996B2

(12) United States Patent
Horton et al.

(10) Patent No.: US 11,866,996 B2
(45) Date of Patent: Jan. 9, 2024

(54) EMERGENCY MULTI-USE TOOL

(71) Applicants: Benjamin S. Horton, Trussville, AL (US); Ryan M. King, Trussville, AL (US); Amos Michael Horton, Trussville, AL (US)

(72) Inventors: Benjamin S. Horton, Trussville, AL (US); Ryan M. King, Trussville, AL (US); Amos Michael Horton, Trussville, AL (US)

( * ) Notice: Subject to any disclaimer, the term of this patent is extended or adjusted under 35 U.S.C. 154(b) by 80 days.

(21) Appl. No.: 17/389,647

(22) Filed: Jul. 30, 2021

(65) Prior Publication Data

US 2023/0032156 A1 Feb. 2, 2023

(51) Int. Cl.
*E06C 7/46* (2006.01)

(52) U.S. Cl.
CPC .................................... *E06C 7/46* (2013.01)

(58) Field of Classification Search
CPC ................ E06C 7/46; E06C 7/44; E06C 7/42
USPC ....................... 182/200; 248/188.2; 254/104
See application file for complete search history.

(56) References Cited

U.S. PATENT DOCUMENTS 947,805 A * 2/1910 Dumont
3,328,065 A * 6/1967 Arenson ................ E05C 17/54 16/86 A
3,993,275 A * 11/1976 Lucas .................... E06C 7/426 248/188.2
4,135,335 A * 1/1979 Jensen ................... E04G 25/00 248/188.2
4,830,320 A * 5/1989 Bellows ................ A47B 91/12 248/188.2
5,139,109 A * 8/1992 Clarke ..................... E06C 7/44 182/108
5,249,767 A * 10/1993 Mellen .................. A47B 91/16 D8/402
5,263,551 A * 11/1993 Andersen ............... E04D 15/00 182/129
5,791,438 A * 8/1998 Kempton ............... E06C 7/426 182/45
6,062,517 A * 5/2000 Torres ................. A47G 27/045 248/188.2
6,164,608 A * 12/2000 Schiel, Jr. ................ E06C 7/44 224/609

(Continued)

FOREIGN PATENT DOCUMENTS

WO WO-03006777 A1 * 1/2003 .............. E06C 7/44

OTHER PUBLICATIONS

Machine translation of WO_03006777_A1_I.*

(Continued)

*Primary Examiner* — Marcus Menezes
(74) *Attorney, Agent, or Firm* — Nolte Lackenbach Siegel

(57) ABSTRACT

During rescue operations, rescue equipment/objects should be secured in a way as to prevent skidding/slippage and/or rolling/sliding. An emergency multi-use tool disclosed and claimed herein satisfies this function with an anti-skid tread on the bottom surface to prevent skidding/slippage and/or rolling/sliding of ground ladders and vehicles on uneven, slippery, and loose terrain. The emergency multi-use tool includes a wedge-shaped body defining an inclined, stepped, top surface and a bottom surface, the top surface defining a longitudinal groove therein and the bottom surface defining an anti-slip tread.

10 Claims, 3 Drawing Sheets

(56) References Cited

U.S. PATENT DOCUMENTS

| | | | | |
|---|---|---|---|---|
| 6,793,041 | B1 * | 9/2004 | Taylor | E06C 7/44<br>182/129 |
| D538,150 | S * | 3/2007 | Burns | D8/402 |
| 7,784,751 | B1 * | 8/2010 | Bellows | A47B 91/00<br>248/346.11 |
| 8,297,567 | B1 * | 10/2012 | Bellows | A47B 91/02<br>248/346.11 |
| 9,717,336 | B1 * | 8/2017 | Apple | A47C 3/04 |
| 2018/0313152 | A1 * | 11/2018 | Koeman, IV | E06C 7/44 |

OTHER PUBLICATIONS

NFPA 1670—Standard on Operations and Training for Technical Search and Rescue Incidents, 2017 Edition, 1 page.

NFPA 1670—Standard on Operations and Training for Technical Search and Rescue Incidents, 3.3.26 Cribbing, 2017 Edition, 1 page.

NFPA1901—Standard for Automotive Fire Apparatus, 26.9 Wheel Chocks, 2016 Edition, 1 page.

NFPA 1911—Standard for the Inspection, Maintenance, Testing, and Retirement of In-Service Emergency Vehicles, 2017 Edition, 1 page.

* cited by examiner

EMERGENCY MULTI-USE TOOL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This section introduces various information from the art that may be related to or provide context for some aspects of the technique described herein and/or claimed below. It provides background information to facilitate a better understanding of that which is disclosed herein. This is a discussion of "related" art. That such art is related in no way implies that it is also "prior" art. The related art may or may not be prior art. The discussion in this section is to be read in this light, and not as admissions of prior art.

Most ground ladders are designed to be used on flat ground. The length of the ground ladder's frame extending below the first rung is typically the same for each side rail of the frame. This provides stability when a load is applied to the ground ladder—for example, when a person climbs the ground ladder. On uneven or inclined surfaces, however, this same feature introduces instability, especially when the ground ladder is loaded. Although there are tools and techniques addressing this issue known to the art, the art is always accepting and in need of new approaches.

This becomes a particular concern in emergency situations involving rescue from structures or vehicles. Such emergency situations present other challenges to be dealt with quickly and efficiently. For example, vehicles on the scene may require stabilization so that they do not undesirably or unintentionally shift or move during rescue operations.

Emergency response personnel accordingly transport and use a variety of tools to address these situations. Although there may be tools currently in use that perform these functions, the art is always accepting of new tools that perform better in each of these roles. If a tool that will outperform currently used tools in multiple roles, that tool represents an improvement to the art.

SUMMARY

In embodiments disclosed herein, an emergency multi-use tool includes a wedge-shaped body including an inclined, stepped, top surface and a bottom surface, the top surface further defining a longitudinal groove therein (interior to the stepped edges) and the bottom surface defining an anti-slip tread.

The above presents a simplified summary of that which is claimed below invention in order to provide a basic understanding of some aspects thereof. This summary is not an exhaustive overview. Nor is it intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The claims below may be understood by reference to the following description taken in conjunction with the accompanying drawings, in which like reference numerals identify like elements, and in which:

While the claimed subject matter is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the subject matter claimed below will now be disclosed. In the interest of clarity, not all features of an actual implementation are described for every example discussed in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
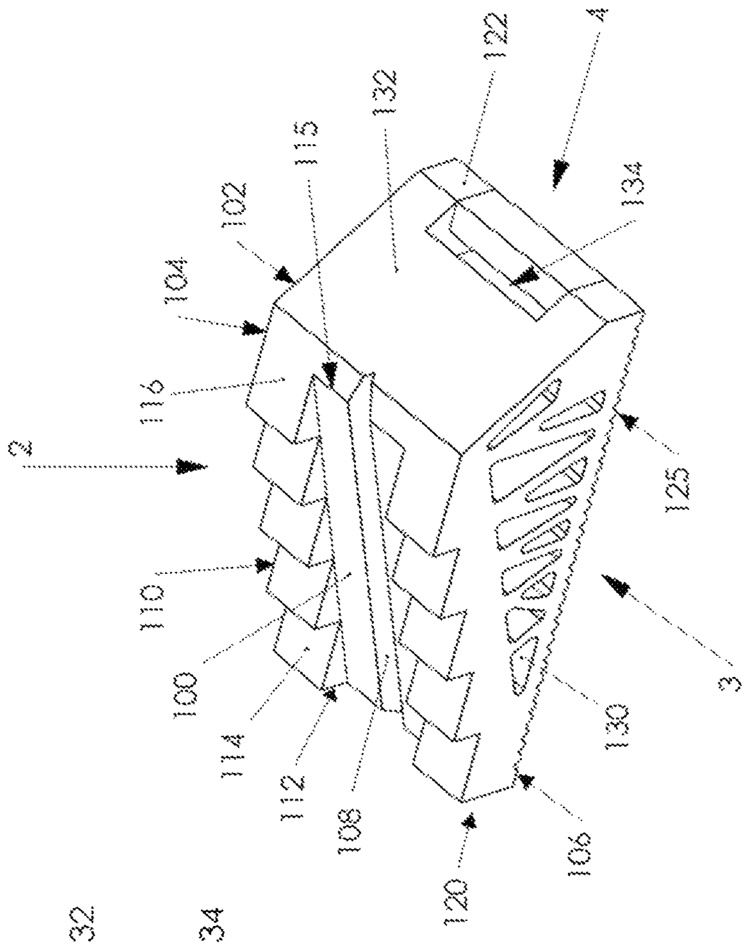
FIG. 1 is a perspective view of an emergency multi-use tool according to one or more examples of the disclosure.
Figure 2:
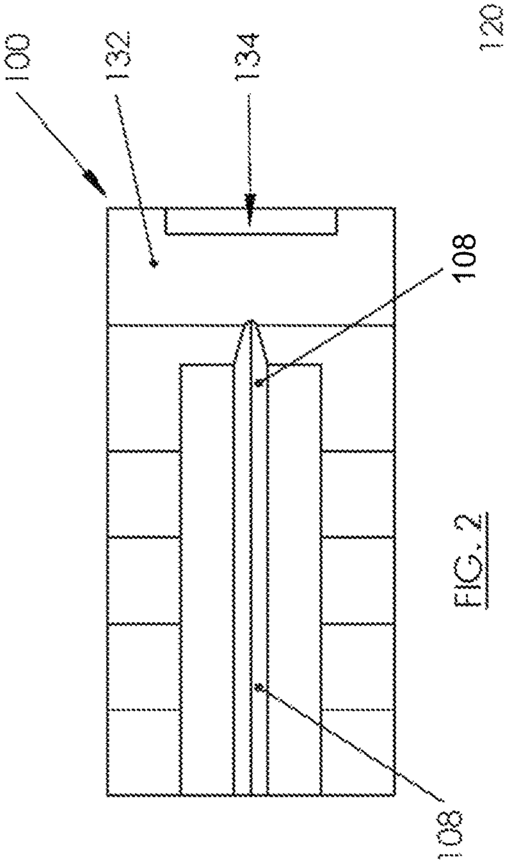
FIG. 2 is a top view of the emergency multi-use tool of FIG. 1.
Figure 3:
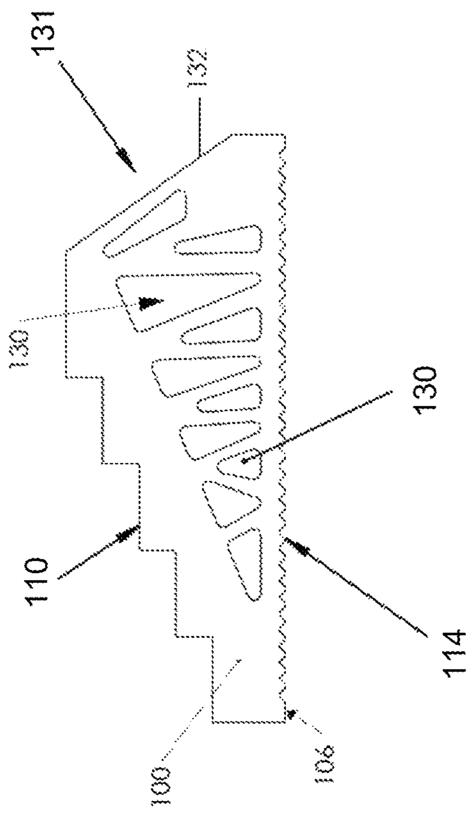
FIG. 3 is a side view of the emergency multi-use tool of FIG. 1.
Figure 4:
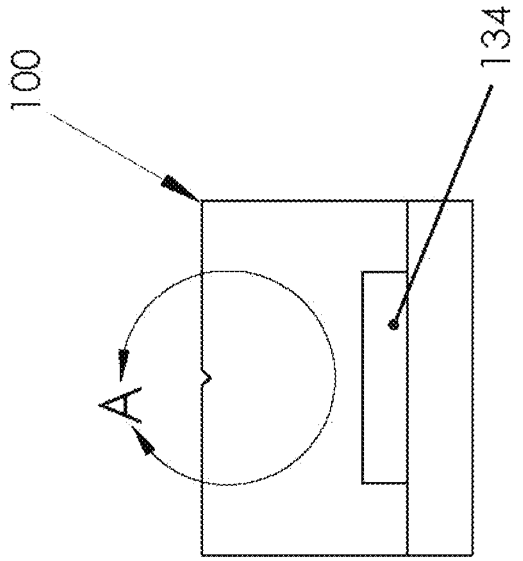
FIG. 4 is an end view of the emergency multi-use tool of FIG. 1.

Turning now to the drawings, FIG. 1 is a perspective view of an emergency multi-use tool 100 according to one or more examples of the disclosure. FIG. 2 is a top view of the emergency multi-use tool of FIG. 1 from the perspective of the arrow 2 in FIG. 1. FIG. 3 is a side view of the emergency multi-use tool of FIG. 1 from the perspective of the arrow 3 in FIG. 1. FIG. 4 is an end view of the emergency multi-use tool of FIG. 1 from the perspective of the arrow 4 in FIG. 1.

Figure 6:
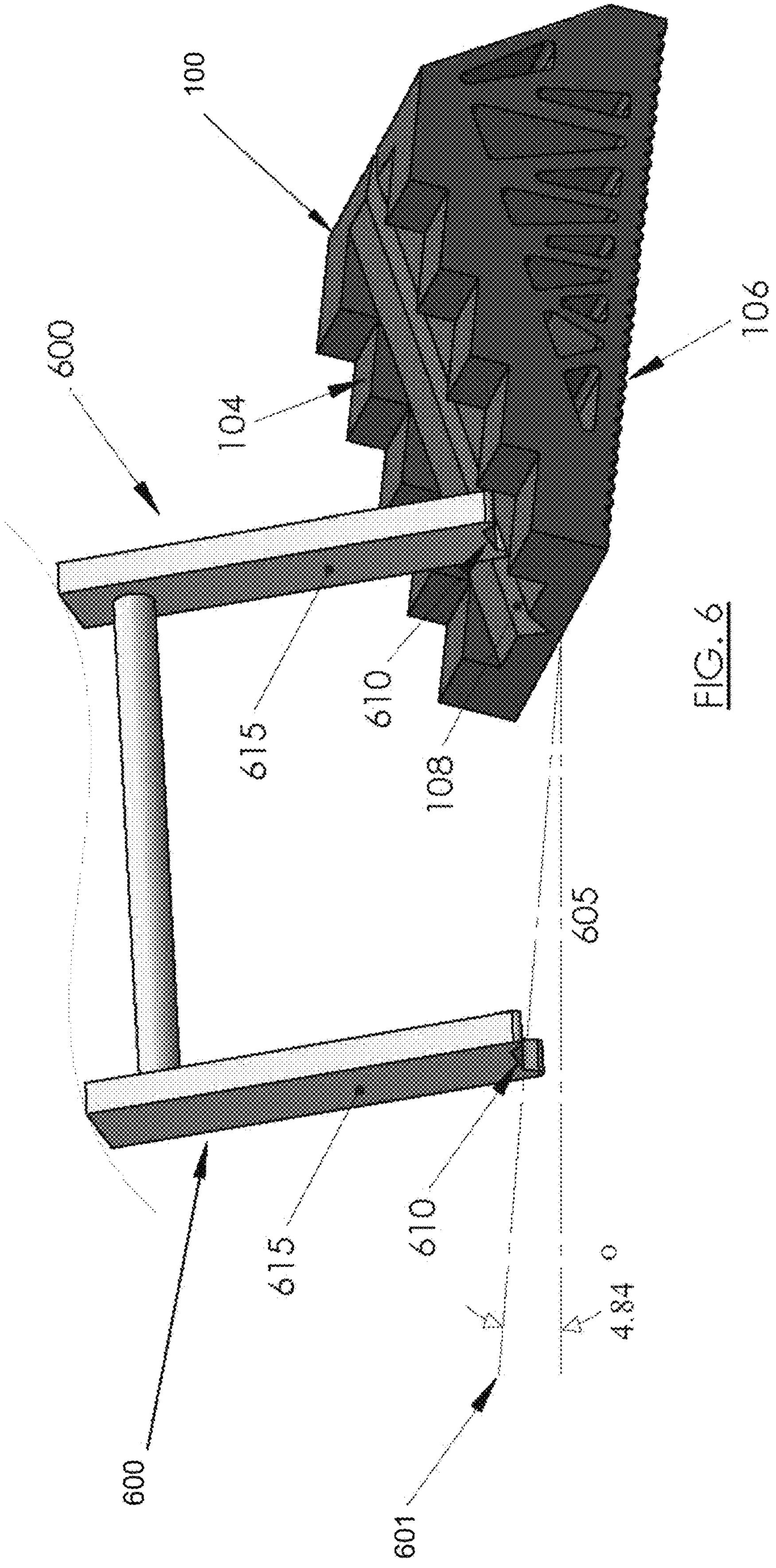
FIG. 6 depicts the emergency multi-use tool of FIG. 1 in use in one particular embodiment.

Referring collectively now to FIGS. 1-4, the emergency multi-use tool 100, in this particular embodiment, may be used for ladder stabilization, tire chocking, and vehicle cribbing. The emergency multi-use tool 100 comprises a wedge-shaped body 102. The wedge-shaped body 102 defines an inclined, stepped, top surface 104 and a bottom surface 106. As used herein, directional terms such as "top" and "bottom" are defined relative to the nominal orientation of the wedge-shaped body 102 when in use as shown in FIG. 6 and relative to the force of gravity.

Figure 5:
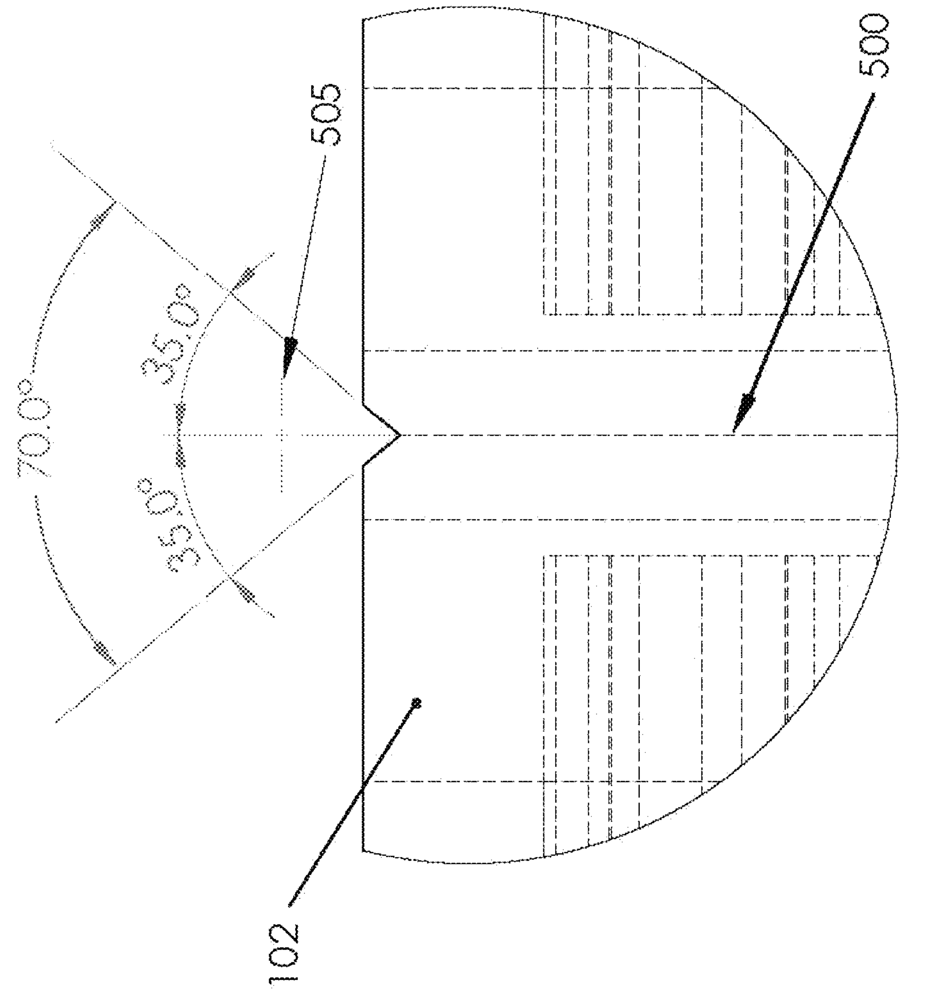
FIG. 5 illustrates the detail A of FIG. 4 in an enlarged view.

As best shown in FIGS. 1-2 and 4, the top surface 104 defines a longitudinal groove 108 therein. The longitudinal groove 108 is, in the illustrated embodiment, a V-shaped notch. As best shown in FIG. 5, the angle defining the V-shape is about 70°, the angle comprising two sub-angles, each sub-angle being about 35° from the vertical.

The term "about" as used herein means that some deviation from the value expressed may be tolerated from sources such as manufacturing tolerances, wear, and others provided that the deviation does not impair the function of the structure under discussion. Thus, some deviation may be tolerated the deviation from the 70° provided longitudinal groove 108 or the top surface 104. The terms "vertical" and "horizontal" as used herein are defined as shown in FIG. 5, in which the axis 500 is vertical and the orthogonal axis 505 is horizontal as defined relative to the plane defined by the bottom surface 106.

The top surface 104 is stepped as mentioned above and, to that end, includes a plurality of steps 110, only one of which is indicated in the drawing. The steps 110 line both sides of an inset 115 as shown best in FIGS. 1-2 in which the longitudinal groove 108 is positioned. The inset 115 may be omitted in some embodiments not shown such that the steps 110 line the longitudinal groove 108 directly.

As is the way of steps, each step 110 includes a riser 112 and a tread 114. The ratio of rise to run presented by the riser 112 and tread 114 of each step 110 will be implementation specific. In the illustrated embodiment, that ratio is 1:1 with the exception of the terminating steps 116. Each terminating step 116 includes an L-shaped tread. Note that the inset 115 terminates earlier than does the longitudinal groove 108 in this particular example as is determined by the L-shaped risers of the terminating steps 116. In alternative embodiments not shown, the terminating steps 116 may present the same ratio of rise to run as the steps 110, and/or the inset 115 may extend the full length of the wedge-shaped body 102, and/or the steps 110 may present varying rise to run ratios.

The steps 110 and terminating steps 116 collectively define an inclination for the top surface 104 from one end 120 to the other end 122. (Or, they define a declination from end 122 to end 120.) The inclination of the top surface 104 in the illustrated embodiment is about 1° to 45° inclusive relative to the bottom surface 106 and from the horizontal. One particular embodiment inclines the top surface 104 at 23° relative to the bottom surface 106. However, other embodiments may use other inclinations/declinations.

The bottom surface 106 defines an anti-slip tread. In the illustrated embodiment, the anti-slip tread comprises a plurality of ridges 125 (only one indicated) defining a tread on the bottom surface 106. The ridges 125 of the anti-slip tread are oriented transverse to the direction of the longitudinal groove 108. The ridges 125 are all of the same pitch and spacing and run parallel to one another. However, other embodiments may use other anti-slip treads. For example, although not shown, the pitch and/or spacing of the ridges 125 may vary. Similarly, the ridges 125 need not necessarily run parallel to one another. Some anti-slip treads may use curvilinear or curved ridges. In the illustrated embodiment, the pitch is 0.67 inches (point to point), the bottom surface interfacing with the ground is a flat feature (as opposed to pointed, for added friction), and the Spacing is 0.14 inches between ridges.

The wedge-shaped body 102 also includes a plurality of optional weight reductions slots 130, only one of which is indicated, as best shown in FIGS. 1 and 3. The slots 130 extend through the wedge-shaped body 102 in this particular embodiment but may not do so in alternative embodiments. The slots 130 may vary in geometry and/or orientation as shown are may be of uniform geometry and/or orientation. Although weight reduction may be desirable in some embodiments, care should be taken not to weaken the structural integrity of the wedge-shaped body 102 for its intended function of stabilizing a ground ladder as disclosed herein. Note that some embodiments may omit the weight reduction slots 130 altogether.

The illustrated embodiment includes a tire chock 131. Vehicular chocking is used during rescue operations to stabilize/immobilize vehicles from rolling or sliding. As shown best in FIGS. 1 and 3, the end 122 of the wedge-shaped body 102 a second inclined surface 132 comprising of an acute angle in relation to the bottom surface 106. In one particular embodiment, the second inclined surface 132 is inclined at an acute angle of 55°. The emergency multi-use tool 100 may be placed snugly against the tire and/or rim of the vehicle's wheel in a manner placing the second inclined surface 132 against the wheel. This will prevent, or at least inhibit, unwanted movement of the vehicle. It is not envisioned that the emergency multi-use tool 100 will be used as a tire chock at the same time that it is being used to stabilize a ground ladder, but the two uses are not mutually exclusive.

A use similar to vehicular chocking is known as vehicular stabilization cribbing, or vehicular cribbing. Vehicular cribbing is used during rescue operations to stabilize/immobilize vehicles from shifting or rolling during extrication of patients/victims involved in a vehicular accident. The emergency multi-use tool 100 also satisfies this function through the use of the step cribbing—i.e., the steps 110, 116—designed into the top surface 104. The cribbing shape is designed for nesting a combination of stacked "2×4's", "4×4's" (commonly used during rescue operations) and/or another emergency multi-use tool 100 positioned upside down and on top of a base emergency multi-use tool 100 to provide vehicular stabilization cribbing ranging 3" to 15" from the ground.

The illustrated embodiment furthermore includes an optional handle. As best shown in FIGS. 1-2 and 4, the end 122 also includes a recess 134. The recess 134 may include a lip (not shown) around the lower edge of the opening to the recess 134. A user may then insert their fingers into the recess 134, curl the fingers under the lip, and carry the emergency multi-use tool 100. This may be useful for larger, heavier embodiments of the emergency multi-use tool 100 but may be omitted in other embodiments.

FIG. 6 shows an emergency multi-use tool 100 in an intended, actual use for stabilizing a ground ladder 600. Ladder stabilization is desirable during rescue operations when an inclined plane 601 exists of a ground surface 605 causes the ground ladder 600 to be unstable or unsafe resulting from adverse material stresses or unstable equipment. More particularly, when being used on an inclined plane a ground ladder 600 will have an uneven healing base that causes one beam (leg) 615 of the ground ladder 600 to be off the ground by a situational distance. This prevents proper heeling which results in ground ladder slippage or localized material overloading. Note that, in distinction from a ground ladder leveler that connects to a ground ladder either temporarily or permanently, the emergency multi-use tool 100 does not connect to the ground ladder 600.

The stabilizing function provided by the emergency multi-use tool 100 is satisfied through a combination of the overall wedge-shaped design combined with the longitudinal groove 108 that interfaces with the ground ladder "butt spur" 610 being placed into the longitudinal groove 108 when the ground ladder 600 is being used on an inclined plane. More particularly, the emergency multi-use tool 100 is oriented with the end 120 positioned on the upward direction of the inclined plane of the ground surface 605 and the end 122 on the downward direction of the incline.

Two modes of stabilization occur in the use depicted in FIG. 6. First, vertical stabilization that prevents vertical movement of a ground ladder beam (leg) 615 by creating an effective level base for the ground ladder 600 to operate on while in use on an inclined plane. Second, horizontal/lateral stabilization reduces the chances of horizontal movement (ground ladder kick-out) during normal ground ladder use. The emergency multi-use tool 100 thereby provides a "heeling base" and prevents localized overloading when being used on an inclined plane. The emergency multi-use tool 100 in the illustrated embodiment is rated at 750 lbs. working load with a 4 to 1 safety margin (at least 3,000 lbs.). The emergency multi-use tool 100 in usage with vehicles is rated at 1,000 lbs. working load with a 4 to 1 safety margin (4,000 lbs.). The illustrated embodiment meets/exceeds all applicable standards established by NFPA 1931.

The V-shape of the longitudinal groove 108 in the illustrated embodiment is compatible with United States fire department ground ladder butt spurs during normal use of a ground ladder at industry recommended ground ladder angles. The angles of the V-shape in the longitudinal groove 108 of the illustrated embodiment are engineered to secure/stabilize the ground ladder butt spur at ground ladder angles of 55° to 80° inclusive. The sidewalls of the V-shaped longitudinal groove 108 are designed at an angle of 35° from the vertical plane resulting in an overall 70° open v-notch groove as discussed above.

With respect to the anti-slip tread discussed above, during rescue operations rescue equipment/objects should be secured in a way as to prevent skidding/slippage. The emergency multi-use tool 100 satisfies this function with an anti-skid tread (e.g., the ridges 125, shown in FIG. 1) on the bottom surface 106 to prevent skidding/slippage of ground ladders and vehicles on uneven, slippery, and loose terrain. The shape of tread (e.g., angles, depth, groove quantity) is engineered to provide optimum anti-skid/anti-slippage on multiple terrains including cement, asphalt, rock, dirt, mud, ice, and snow.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An emergency multi-use tool, comprising:

a wedge-shaped body defining a first inclined, stepped, top surface, a first end surface, and a bottom surface, wherein:

the top surface is adapted to provide vehicle cribbing support by including a plurality of steps, each step comprising a riser and a tread and extending across the entirety of the top surface, and defines a single, centrally located longitudinal groove therein that is inset for less than the entire length of the top surface through the plurality of steps, the longitudinal groove includes a V-shaped notch adapted to prevent a fire ladder butt spur kickout;

the first end surface defines a rescue vehicle tire chock; and the bottom surface defines, in conjunction with the first end surface, defines a handle adapted for a user to grip entirely through an opening in a portion of the first end surface.

2. The emergency multi-use tool of claim 1, wherein the angle defining the V-shaped notch is about 70° to adapt the V-shaped notch to receive a ladder equipped with butt spurs at ladder angles of inclination between 55° to 80° inclusive to prevent fire ladder butt spur kickout.

3. The emergency multi-use tool of claim 1, wherein the angle defining the V-shaped notch comprises two sub-angles, each sub-angle being about 35° from the vertical to receive a ladder equipped with butt spurs at ladder angles of inclination between 55° to 80° inclusive to prevent fire ladder kickout prevention.

4. The emergency multi-use tool of claim 1, wherein the tire chock is a second inclined surface inclined at an acute angle of about 55° in relation to the bottom surface of the wedge-shaped body.

5. The emergency multi-use tool of claim 1, wherein the wedge-shaped body defines a plurality of weight reduction slots.

6. The emergency multi-use tool of claim 1, wherein the bottom surface defines an anti-slip tread comprises a plurality of ridges transverse to a direction of the longitudinal groove.

7. The emergency multi-use tool of claim 1, wherein the inclination of the top surface in relation to the bottom surface is between about 21° to about 45° inclusive to provide a level surface for supporting a ladder butt spur in the single, longitudinal V-notch groove and to provide fire ladder butt spur kickout prevention.

8. The emergency multi-use tool of claim 1, wherein the top surface defines an inset within the plurality of steps at a depth to not entirely remove the top level of steps in which the longitudinal groove is defined.

9. The emergency multi-use tool of claim 1, wherein the single, longitudinal groove is rated for ladders equipped with butt spurs at 750 lbs. working load with a 4 to 1 safety margin.

10. The emergency multi-use tool of claim 1, wherein:

each of the plurality of steps defines a crib step surface level; and each crib step surface level extending across the entirety of the top surface is rated for vehicle cribbing at 1,000 lbs. working load with a 4 to 1 safety margin.

* * * * *